(12) United States Patent
Ida

(10) Patent No.: US 11,858,050 B2
(45) Date of Patent: Jan. 2, 2024

(54) CUTTING INSERT

(71) Applicant: TUNGALOY CORPORATION, Fukushima (JP)

(72) Inventor: Takehiro Ida, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 17 days.

(21) Appl. No.: 17/725,315

(22) Filed: Apr. 20, 2022

(65) Prior Publication Data
US 2022/0347762 A1 Nov. 3, 2022

(30) Foreign Application Priority Data

Apr. 30, 2021 (JP) .................................. 2021-077020

(51) Int. Cl.
*B23B 27/16* (2006.01)
*B23B 27/22* (2006.01)
*B23B 27/14* (2006.01)

(52) U.S. Cl.
CPC ......... *B23B 27/1611* (2013.01); *B23B 27/145* (2013.01); *B23B 2200/0433* (2013.01); *B23B 2200/081* (2013.01)

(58) Field of Classification Search
CPC ......... B23B 27/1611; B23B 2200/0433; B23B 2200/081; B23B 2200/204; B23B 2200/286; B23B 27/145; B23B 27/143; B23B 27/00; B23B 27/005; B23B 27/22; B23B 2200/0447; B23B 27/1607; B23B 2200/321; B23B 2200/085; B23B 27/16
See application file for complete search history.

(56) References Cited

U.S. PATENT DOCUMENTS

| | | | | |
|---|---|---|---|---|
| 3,866,282 A | * | 2/1975 | Lundgren | B23B 27/143 407/116 |
| 5,230,591 A | * | 7/1993 | Katbi | B23B 27/143 407/116 |
| 5,466,097 A | * | 11/1995 | Wallstrom | B23C 5/202 407/113 |
| 5,947,651 A | * | 9/1999 | Murakami | B23B 27/143 407/115 |

(Continued)

FOREIGN PATENT DOCUMENTS

| | | |
|---|---|---|
| JP | S49-032279 A | 3/1974 |
| JP | H09-057507 A | 3/1997 |

(Continued)

*Primary Examiner* — Sara Addisu
(74) *Attorney, Agent, or Firm* — Studebaker & Brackett PC

(57) ABSTRACT

It is intended to allow a wide range including a low region (fine finishing) to a middle region (medium cutting) to be covered with a single insert. A cutting insert includes an upper surface, a lower surface, a peripheral side surface, a cutting edge including a main cutting edge and a corner cutting edge, a corner portion, a projecting portion formed to extend from the corner portion toward a central axis and including a first projection and a second projection, a rake portion, and an inclined portion provided at the cutting edge. The inclined portion has a first inclined portion beginning at an intermediate point in the corner cutting edge, while the rake portion has a shape in which an angular degree of a rake angle gradually increases with distance from the corner portion.

9 Claims, 15 Drawing Sheets

(56) References Cited

U.S. PATENT DOCUMENTS

| | | | |
|---|---|---|---|
| 7,438,508 B2* | 10/2008 | Alm | B23B 27/145 |
| | | | 407/115 |
| 8,657,540 B2* | 2/2014 | Yamazaki | B23B 27/143 |
| | | | 407/116 |
| 8,702,354 B2* | 4/2014 | Schleinkofer | B23B 27/143 |
| | | | 407/113 |
| 8,814,480 B2* | 8/2014 | Cohen | B23B 27/143 |
| | | | 407/113 |
| 10,046,396 B2* | 8/2018 | Kobayashi | B23B 27/143 |
| 10,076,788 B2* | 9/2018 | Krishtul | B23B 27/143 |
| 11,642,727 B2* | 5/2023 | Johansson | B23B 27/143 |
| | | | 407/113 |
| 2011/0033252 A1* | 2/2011 | Nishida | B23B 27/143 |
| | | | 407/114 |
| 2011/0070039 A1* | 3/2011 | Park | B23B 27/141 |
| | | | 407/113 |
| 2013/0236257 A1* | 9/2013 | Nada | B23B 27/1607 |
| | | | 407/114 |
| 2017/0209935 A1* | 7/2017 | Furusawa | B23B 27/045 |
| 2022/0266349 A1* | 8/2022 | Ida | B23B 27/1648 |

FOREIGN PATENT DOCUMENTS

| | | |
|---|---|---|
| JP | 2002-178210 A | 6/2002 |
| JP | 2006-110666 A | 4/2006 |
| JP | 2016-530116 A | 9/2016 |
| JP | 2019-155558 A | 9/2019 |
| WO | 2015/036990 A1 | 3/2015 |
| WO | 2015/046558 A1 | 4/2015 |

* cited by examiner

CUTTING INSERT

BACKGROUND

Field

The present invention relates to a cutting insert.

Description of Related Art

Conventionally, as tools for turning, cutting inserts with various structures have been used and, as one of such cutting inserts, a cutting insert provided with, e.g., a breaker projection (projecting portion) extending to the vicinity of a corner portion and with a slant (inclination) of a cutting edge in side view is disclosed (see WO 2015/046558 A1). The cutting insert disclosed in WO 2015/046558 A1 has the breaker projection so as to ensure chip control during finishing. At the same time, the cutting insert is formed such that the breaker projection has a height that increases temporarily and then decreases to allow cutting to be performed also with a high-depth-of-cut.

SUMMARY

However, in reality, a conventional cutting insert as described above is requested to allow a wide region including a low region (fine finishing) and a middle region (medium cutting) to be covered (handled) with a single cutting insert. In light of such reality, it is considered that a request such as described above is satisfied by providing a cutting insert having a structure appropriate for, e.g., finishing (the low-depth-of-cut/low-feed-rate machining) also with a structure having a so-called expanded application range, while allowing the cutting insert to maintain such a characteristic feature, so as to allow quality cutting to be carried out even when cutting is performed with a high-depth-of-cut.

It is therefore an object of the present invention to provide a cutting insert which allows a wide region, including a low region (fine finishing) and a middle region (medium cutting), to be covered with a single cutting insert.

An aspect of the present invention is a cutting insert including: an upper surface serving as a first end surface; a lower surface serving as a second end surface opposite to the upper surface and having a mounting surface to be brought into contact with a body of a cutting tool; a peripheral side surface formed to connect the upper surface and the lower surface; a cutting edge including a main cutting edge and a corner cutting edge, the main cutting edge and the corner cutting edge being formed at an intersecting edge between the upper surface and the peripheral side surface; a corner portion including the corner cutting edge; a projecting portion including a first projection formed to extend from the corner portion toward a central axis extending through a center of the upper surface in a direction perpendicular to the lower surface and having a top surface having a height gradually decreasing with distance from the corner portion toward the central axis and a second projection continued to the first projection and having a top surface having a height gradually increasing with distance from the first projection toward the central axis; a rake portion formed between the projecting portion and the cutting edge; and an inclined portion provided to extend from an intermediate point in the corner cutting edge to the cutting edge such that a height of the cutting edge gradually decreases with distance from the corner cutting edge, the inclined portion including a first inclined portion beginning at the intermediate point in the corner cutting edge, and the rake portion having a shape in which an angular degree of a rake angle gradually increases with distance from the corner portion.

According to an aspect as described above, it is possible to provide a cutting insert particularly appropriate for finishing (low-region machining such as low-depth-of-cut/low-feed-rate machining) and having an application range that can be expanded even on a high-depth-of-cut side, i.e., a cutting insert intended mainly for use under a low-depth-of-cut condition, but is also improved to be able to perform middle-region machining under high-depth-of-cut/low-feed-rate conditions. Specifically, by providing a configuration that achieves various effects such that the first projection provided at a position on the upper surface closer to the corner portion to serve as a leading end projection attributes to improvement of chip particularly in a low region, that the inclined portion (inclination) provided at the cutting edge so as to begin in the vicinity of (at an intermediate point in) the corner cutting edge functions earlier to allow the chip to flow, that the rake portion formed to have the rake angle larger during middle region machining than during low region machining functions to inhibit burrs/chattering during the middle region machining, that the rake portion having the shape in which the rake angle gradually increases with distance from the corner portion advances the chip along the rake portion, while curling the chip, and that too many discharge paths (chip pockets) result in a problem, but such a problem is prevented by providing the second projection with a preferred shape that at most guides the chip, a structure is provided which is particularly appropriate for finishing (low-depth-of-cut/low-feed-rate machining), but also has a so-called expanded application range so as to allow quality cutting to be carried out even when cutting is performed with a high-depth-of-cut.

In a cutting insert as described above, the inclined portion may further include a second inclined portion connected to the first inclined portion and having a gradient larger than the of the first inclined portion.

In a cutting insert as described above, the rake portion in the vicinity of the corner portion may form a substantially flat surface.

In a cutting insert as described above, the rake portion in the vicinity of the corner portion may have a shape in which the rake angle is formed according to a gradient of the first inclined portion.

In a cutting insert as described above, the rake portion may be formed such that the angular degree of the rake angle gradually increases with distance from the corner portion.

In a cutting insert as described above, a peak point of the first projection may be higher than a cutting edge of the corner cutting edge.

In a cutting insert as described above, the first projection may have a height gradually decreasing with distance from the peak point toward the central axis.

In a cutting insert as described above, the second projection may have a top surface formed to have a portion inclined to be gradually higher with distance from the first projection toward the central axis.

In a cutting insert as described above, a side portion of the second projection may be formed in a multi-step shape.

In a cutting insert as described above, a portion of the second projection located between the top surface and the rake portion may be formed with a wall surface.

In a cutting insert as described above, the wall surface may have a first-level wall surface rising from the rake portion and a second-level wall surface provided between the first-level wall surface and the top surface.

In a cutting insert as described above, the first-level wall surface may be formed such that a size of a space, formed between the first-level wall surface and the rake portion so as to allow chip to flow, gradually decreases with distance from the corner portion.

DETAILED DESCRIPTION

Figure 1:
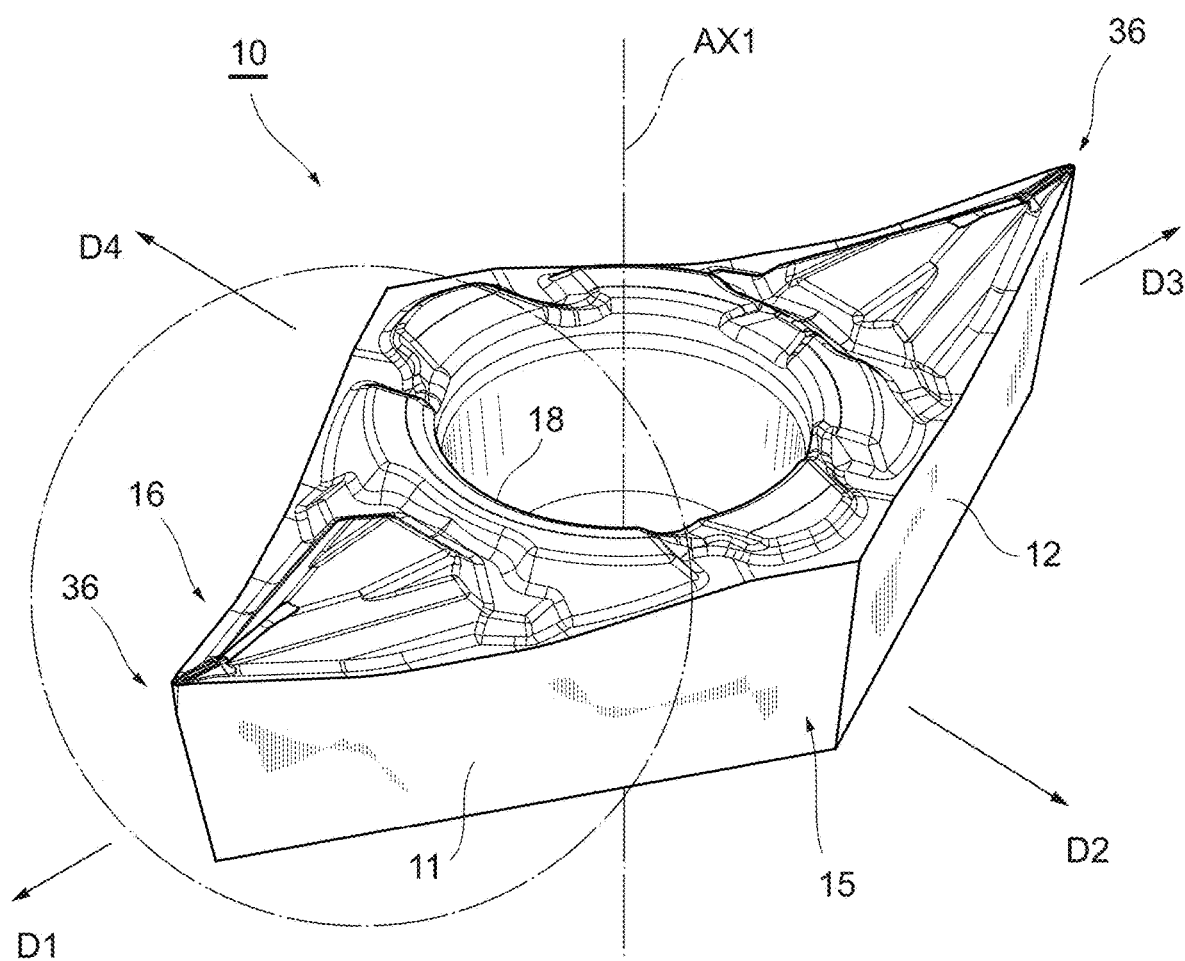
FIG. 1 is a perspective view illustrating an example of a cutting insert as an embodiment of the present invention.

Referring to the drawings, a detailed description will be given below of a preferred embodiment of a cutting insert according to the present invention (see FIG. 1 and the like). The following will first describe an outline of a cutting insert 10 to be used to cut a work (material to be cut) 100, and then describe a characteristic portion of the cutting insert 10 according to the present invention (see FIG. 1 and the like). It is assumed that, in the following description, for the sake of convenience, wording "a low region" and "a middle region" is used. The "low region" refers to cutting in a state where an amount of cutting is relatively small or to a range of a cutting edge or a breaker projection to be used for such cutting, while the "middle region" refers to cutting in a state where the amount of cutting is larger or to a range of the cutting edge or the breaker projection to be used for such cutting.

Outline of Cutting Insert

Figure 2:
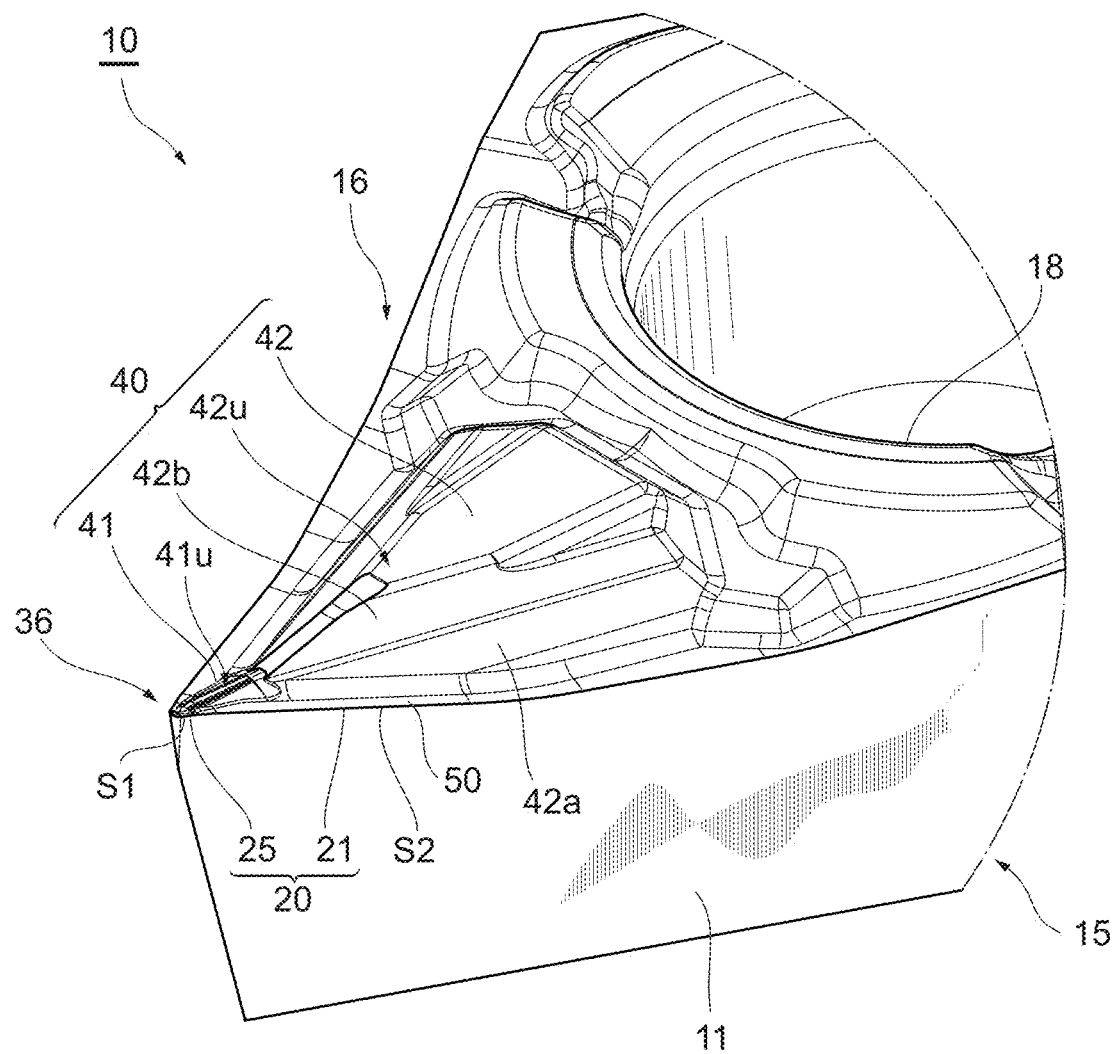
FIG. 2 is a diagram illustrating a portion (encircled portion) of FIG. 1 in enlarged relation.
Figure 3:
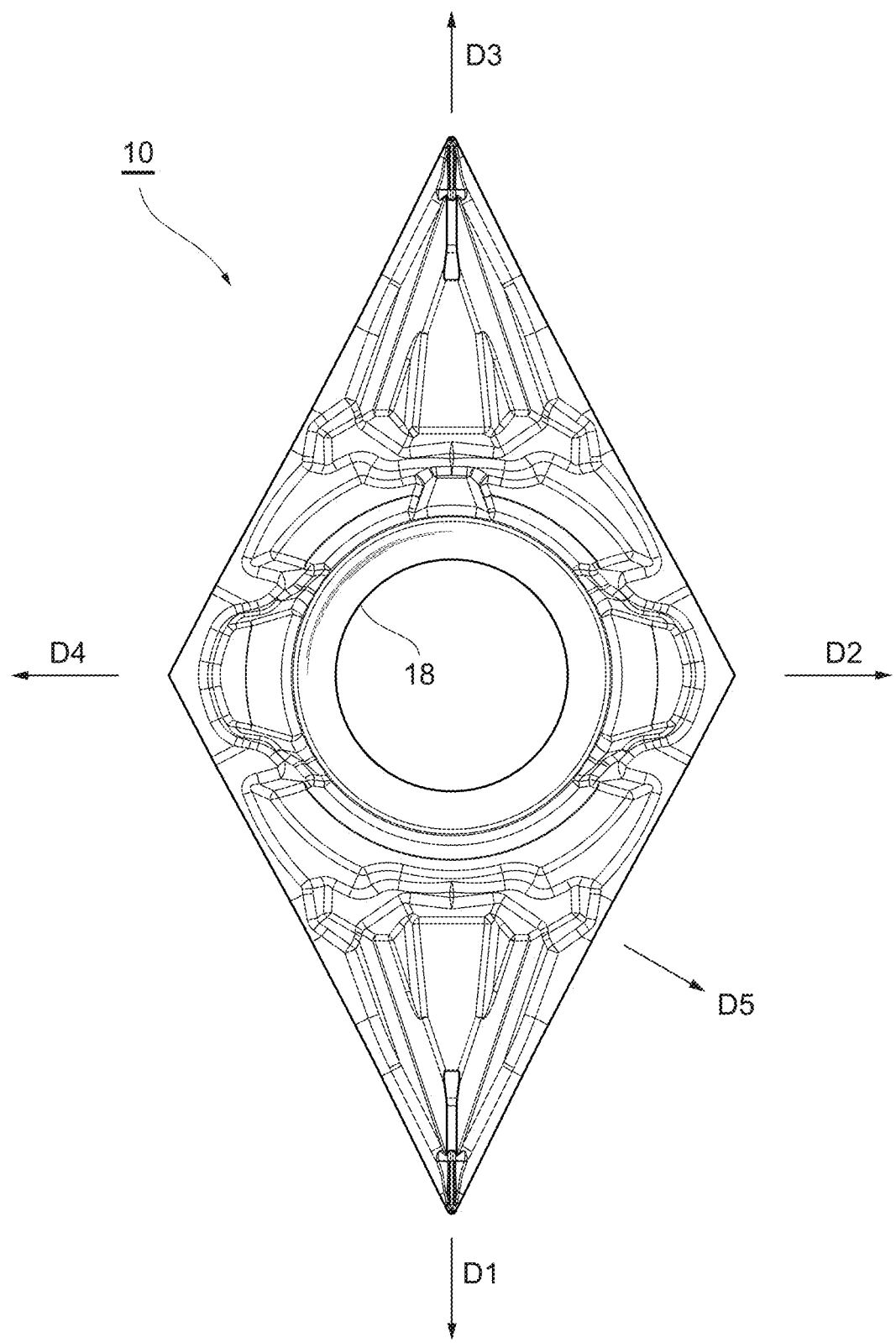
FIG. 3 is a plan view illustrating an example of the cutting insert.

The cutting insert 10 illustrated in FIG. 1 and the like is configured as an insert that is mounted on a body (illustration of which is omitted) of a cutting tool by being 180° rotated around a central axis AX1 passing through a center of an upper surface 17 and perpendicular to a lower surface 19 to allow each of a pair of cutting edges 20 to be used (see FIG. 1, FIG. 3, and the like). In a center portion of the cutting insert 10, a screw hole 18 through which a mounting screw (illustration of which is omitted) is to pass is formed to extend through the upper surface 17 and the lower surface 19 (see FIG. 2, FIG. 3, and the like). When the cutting insert 10 is to be mounted on the body, the lower surface 19 functions as a mounting surface to be brought into contact with the body.

Figure 4:
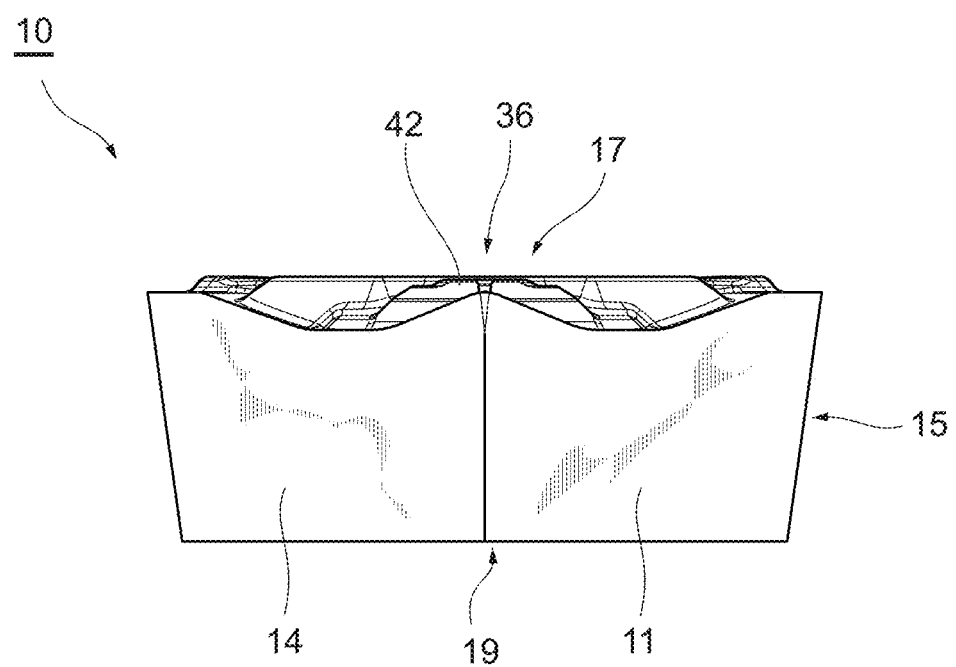
FIG. 4 is a front view obtained by viewing the cutting insert along a longitudinal direction.
Figure 5:
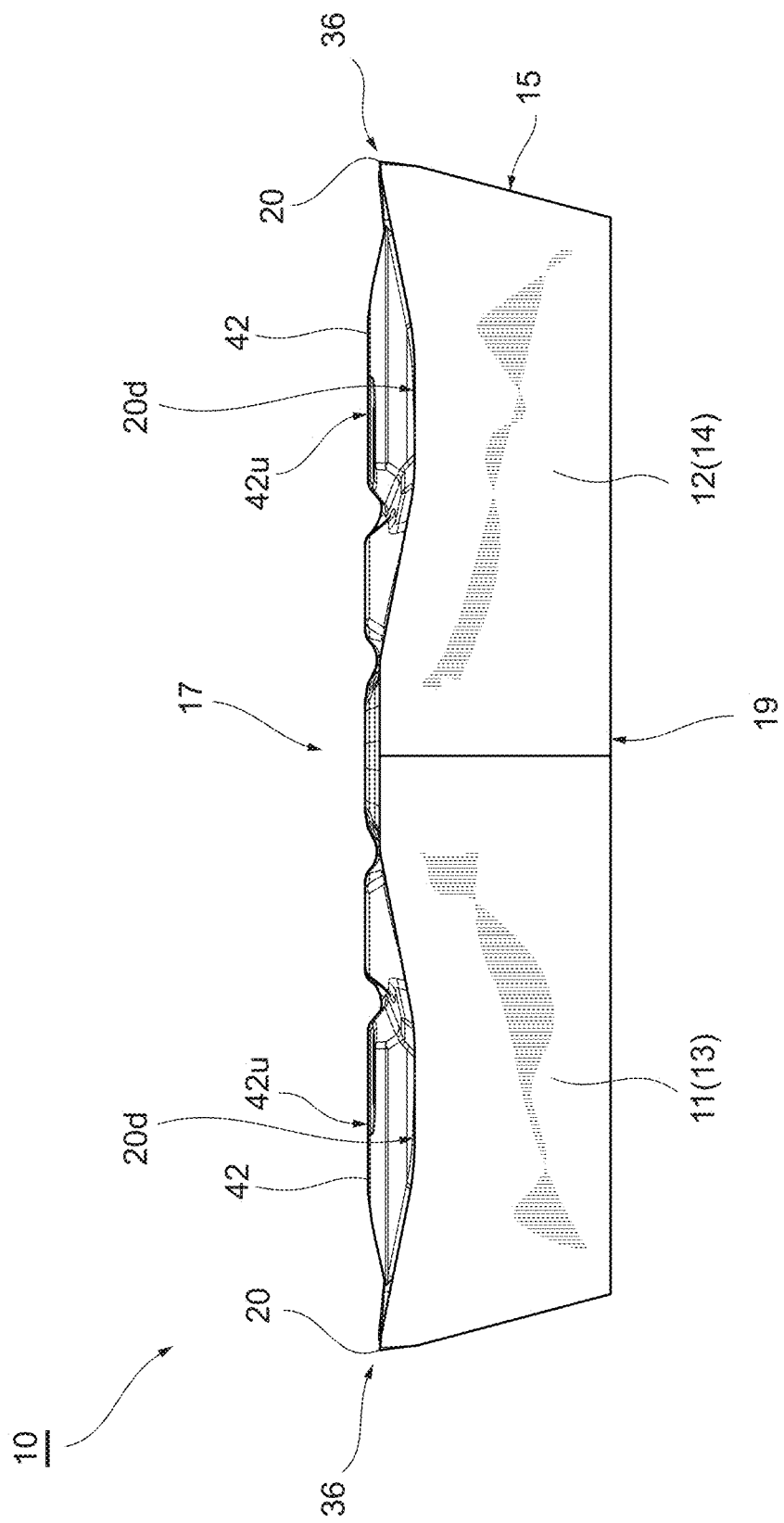
FIG. 5 is a side view obtained by viewing the cutting insert along a lateral direction.

The cutting insert 10 in the present embodiment includes the upper surface 17 serving as a first end surface facing in an upward direction along the central axis AX1 in FIG. 1, the lower surface 19 serving as a second end surface facing in a downward direction opposite to the upward direction, and a peripheral side surface 15 including a first peripheral side surface portion 11, a second peripheral side surface portion 12, a third peripheral side surface portion 13, and a fourth peripheral side surface portion 14 and connecting the upper surface 17 and the lower surface 19. Each of these first peripheral side surface portion 11, second peripheral side surface portion 12, third peripheral side surface portion 13, and fourth peripheral side surface portion 14 is formed to be inclined to have an overhanging shape (see FIG. 4) such that an area of the lower surface 19 is smaller than that of the upper surface 17 (see FIG. 4) and thereby serve as a flank for each of the cutting edges 20 (see FIG. 4, FIG. 5, and the like). Note that, as described above, the cutting insert 10 in the present embodiment has a symmetrical shape which allows the cutting insert 10 to be used by being 180° rotated around the central axis AX1. Accordingly, shapes or structures of corner portions 36, the cutting edges 20, and the like described below apply to any pair of members having a symmetrical shape unless otherwise specified.

In top view (see FIG. 3), the upper surface 17 has a rhomboidal shape (diamond shape) including a pair of substantially parallel side ridge portions. For the sake of convenience, it is assumed that one of directions (each referred to as a "longitudinal direction" in the present specification) in which the longer one of two diagonals of the rhomboidal shape extends is a first direction D1, another of the directions is a third direction D3, one of directions (each referred to as a "lateral direction" in the present specification) in which the shorter one of the diagonals extends is a second direction D2, and another of the directions is a fourth direction D4 (see FIG. 1, FIG. 3, and the like). In the first and third directions D1 and D3 of the cutting insert 10, the respective corner portions 36 are formed (see FIG. 2 and the like). Note that, to show the shape and structure of the cutting insert 10 described in the present embodiment when viewed sideways, a view obtained by viewing the cutting insert 10 in a direction perpendicular to one of the cutting edges 20 (to the longitudinal direction thereof) (an example of such a direction is denoted by a reference sign D5 for the sake of convenience in FIG. 3 and the like) is considered to be easier to understand than a view obtained by viewing the cutting insert 10 along the lateral direction (i.e., a view obtained by viewing the cutting insert 10 in the second direction D2 or the fourth direction D4). In the present specification, for the sake of convenience, a view obtained by thus viewing the cutting insert 10 along the direction D5 is referred to as a sideview view, and such sideview views are illustrated in some of the drawings (see FIG. 7 and FIG. 9).

At an intersecting edge (side ridge portion) 16 between the peripheral side surface 15 and the upper surface 17, the cutting edges 20 each including a main cutting edge 21 and a corner cutting edge 25 are formed (see FIG. 1 and the like). The corner cutting edge 25 is formed in the corner portion 36 described above. The main cutting edge 21 is formed to be continued to the corner cutting edge 25 (see FIG. 2 and the like).

Figure 15:
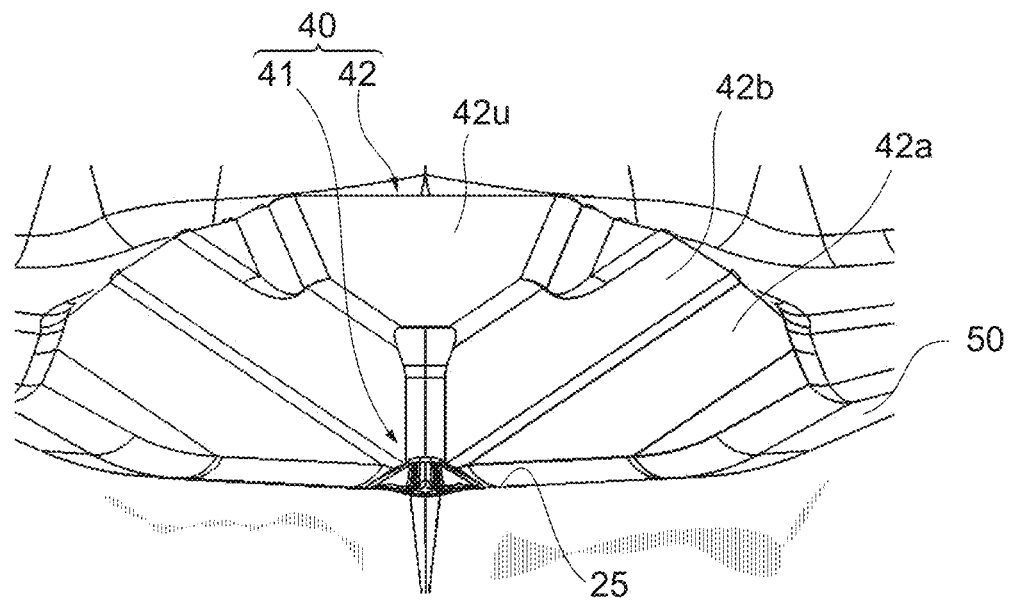
FIG. 15 is a perspective view illustrating the portion of the cutting insert including the first projection and the second projection, which is obtained by viewing the cutting insert along the longitudinal direction.
Figure 16:
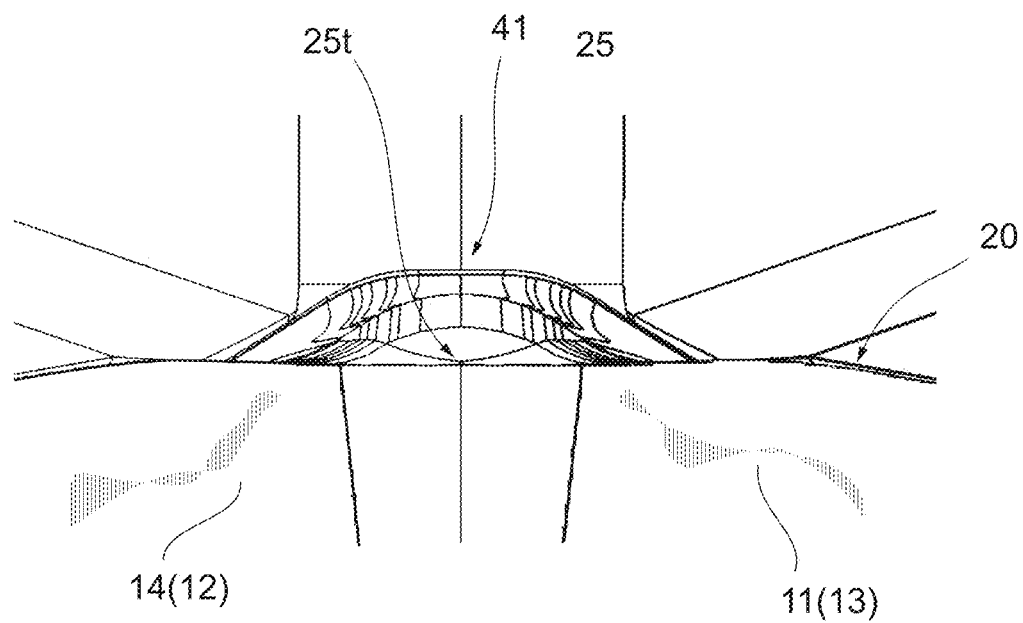
FIG. 16 is a perspective view illustrating the portion of the cutting insert including the first projection, which is obtained by viewing the cutting insert along the longitudinal direction.

On the upper surface 17, a projecting portion 40 including a first breaker projection (first projection) 41 and a second breaker projection (second projection) 42 is formed to extend from the corner portion 36 toward the central axis AX1 (see FIG. 15, FIG. 16, and the like).

Figure 6:
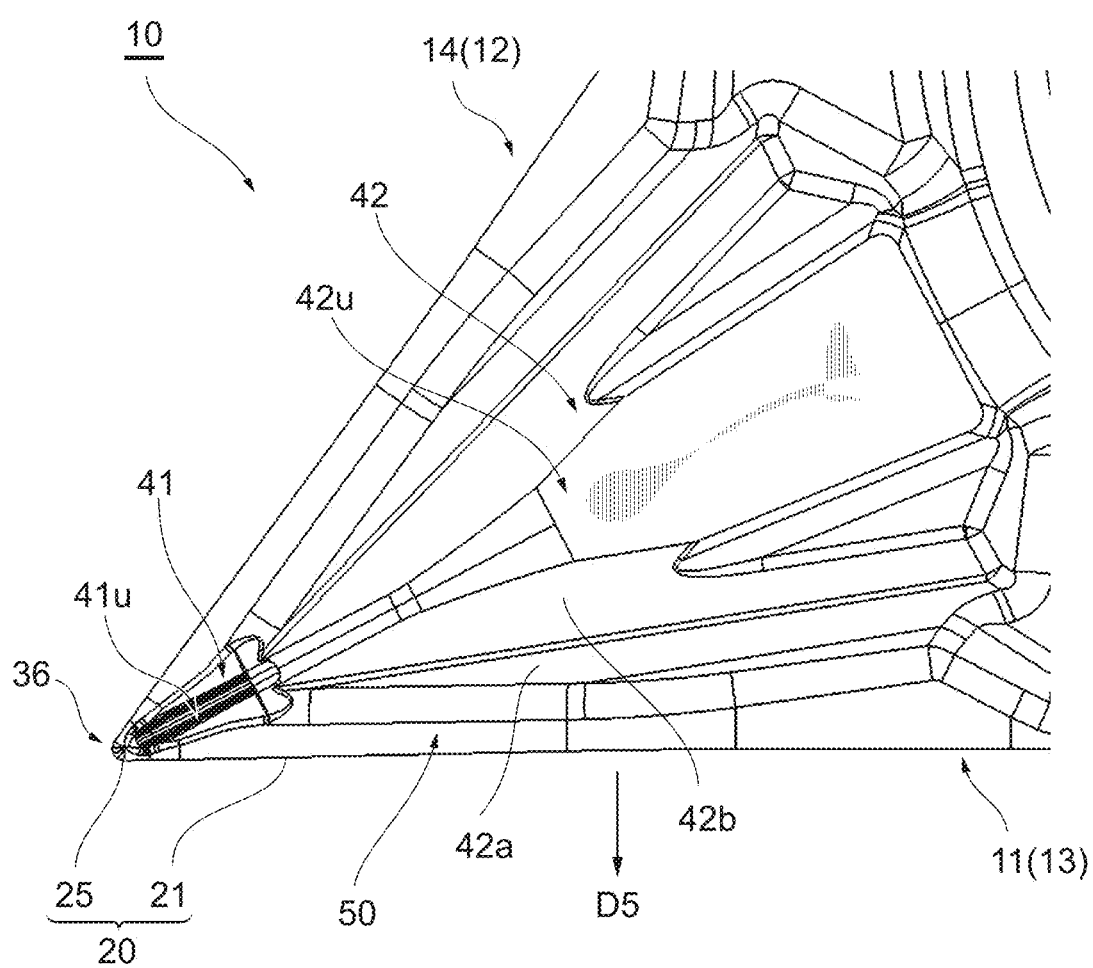
FIG. 6 is a partial plan view of the cutting insert illustrating a portion thereof with a first projection and a second projection in enlarged relation.

The first breaker projection 41 is formed at a position close to the corner portion 36 to have an elongated shape extending along the longitudinal direction (see FIG. 6, FIG. 16, and the like). The first breaker projection 41 is formed to have a top surface 41$u$ having a height increasing from the corner portion 36 toward the central axis AX1 along the longitudinal direction (see the portion indicated by the right-up arrow in FIG. 7) to reach a peak point 41$p$, while being gently inclined, and then gradually decreasing with distance from the peak point 41$p$ toward the central axis AX1 (see FIG. 7). The first breaker projection 41 is also formed such that the peak point 41$p$ is higher than a cutting edge 25$t$ of the corner cutting edge 25 (see FIG. 7). The first breaker projection 41 having such a shape contributes to securing a space (a so-called pocket-like space) for allowing chip (denoted by a reference numeral 101 in FIG. 14A) to flow between the first breaker projection 41 and the cutting edge 20 and to inhibiting over-restraint. Generation of the chip 101 starts at the first breaker projection 41 as a portion closest to the corner cutting edge 25 under any condition even in the low region or in the middle region.

A more specific description will be given of the foregoing (see FIG. 7 and the like). In general, when a rake angle is excessively increased, the chip 101 goes into a deeper portion along a rake surface of a rake portion 50 of concern. In the present specification, bumping of the chip 101 onto the first breaker projection 41 in such a state is referred to as the "over-restraint". An increased restraining force is advantageous in terms of finely cutting the chip 101, but it can also be said that such a form forcibly deforms the chip 101 against a natural flow of the chip 101 and removes the chip 101 from the work (material to be cut) 100. Consequently, in some cases, scratches, burrs, and the like are more likely to be formed on a machined surface. It can also be said that, as long as the projection-type breaker is provided so as to cut the chip, such a problem cannot be avoided to some extent but, in a product in which the corner portion 36 has a sharp rake angle, blockage/over-restraint of the chip 101 may actually occur to result in a rough surface. In the present embodiment, to solve the problem in view of such a situation, it is intended to reduce an angle difference between a gradient (angular degree) θ1 of a first inclination S1 and the rake angle of the rake portion 50, and therefore it can be said that the portion of concern is flatter. It can also be said that the height of the first breaker projection 41 is reduced after the peak (after the peak point 41$p$ is passed) similarly because, as the height of the projection viewed from a cutting edge cross section is larger, the chip 101 is excessively strongly restrained. Note that, when an optimum rake angle is set for the portion provided with the first inclination S1, the portion of concern can be flattened.

The second breaker projection 42 is formed to be continued to the first breaker projection 41. The second breaker projection 42 in the present embodiment has a top surface 42$u$ inclined from the first breaker projection 41 to be higher with approach to the central axis AX1, and also has a first-level wall surface 42$a$ and a second-level wall surface 42$b$ (see FIG. 2, FIG. 15, and the like). The top surface 42$u$ may include a rather streamlined portion having a gently increasing height or may also include a multi-level wall surface. The first-level wall surface 42$a$ is used mainly as a guide which restrains the chip 101, while the second-level wall surface 42$b$ is formed so as to secure a pocket for allowing the chip 101 to flow, though not directly greatly contributing to cutting performance. The first-level wall surface 42$a$ and the second-level wall surface 42$b$ are basically configured in a two-level structure to allow a space that is not excessively large to be formed so as to guide the chip 101 formed in a helical shape. In the present embodiment, the first-level wall surface 42$a$ is configured so as to serve mainly as the guide, while the second-level wall surface 42$b$ has an appropriately spacious configuration (with a larger space).

The first-level wall surface 42$a$ is formed as a wall surface that functions particularly when cutting is performed with the middle region. The first-level wall surface 42$a$ may also include a multi-level wall surface, but is more preferably configured to have a gently varying streamlined shape. The first-level wall surface 42$a$ in the present embodiment includes a wall surface formed to rise from the rake portion 50 toward the top surface 42$u$, and is formed to function particularly as the guide that restrains the chip 101 resulting from cutting by the main cutting edge 21 particularly when the cutting is performed with the middle region (see FIG. 1 and the like). The first-level wall surface 42$a$ in the present embodiment is formed such that a space (chip pocket) having such an appropriate size and an appropriate shape as to allow the chip 101 to smoothly flow rearward (in a direction away from the corner portion 36) is formed between the first-level wall surface 42$a$ and the rake portion 50 so as to, e.g., gradually decrease in size with distance from the corner portion 36. The first-level wall surface 42$a$ thus configured guides (helps) the chip 101 such that the chip 101 smoothly flows particularly when cutting is performed with the middle region, and may further achieve an effect of inhibiting the chip from being tangled as a result of being swung (see FIG. 14A and the like) or the like.

The second-level wall surface 42$b$ is formed as a wall surface that functions to guide the chip 101 extending over the first-level wall surface 42$a$ and allow the chip 101 to smoothly flow. If an extremely long chip pocket is left on a middle region side, when the long helical chip 101 is generated, the pocket may result in a case where the chip 101 cannot successfully be processed, and is swung to be tangled. Therefore, the present embodiment assumes such a case and allows the chip 101 extending over the first-level wall surface 42$a$ to be processed with the second-level wall surface 42$b$.

Figure 10:
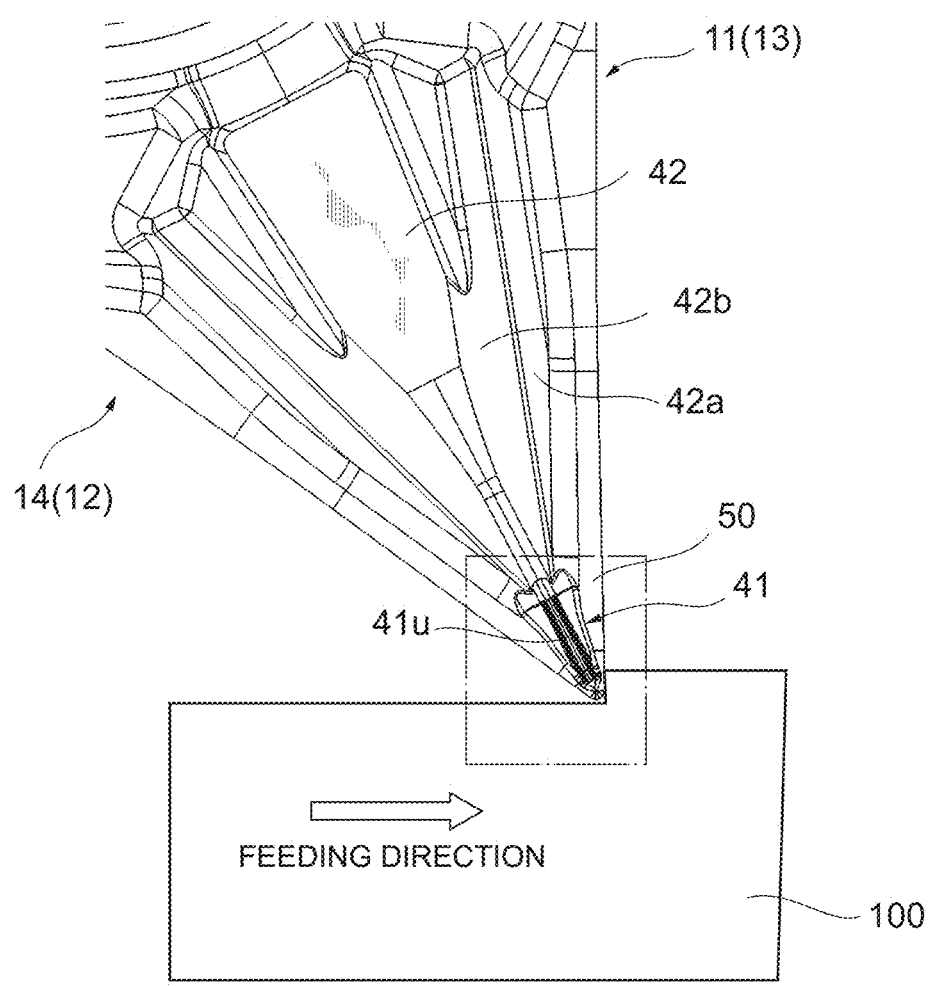
FIG. 10 is a diagram illustrating an image during machining with a low region (a low-depth-of-cut) of the cutting insert.
Figure 12:
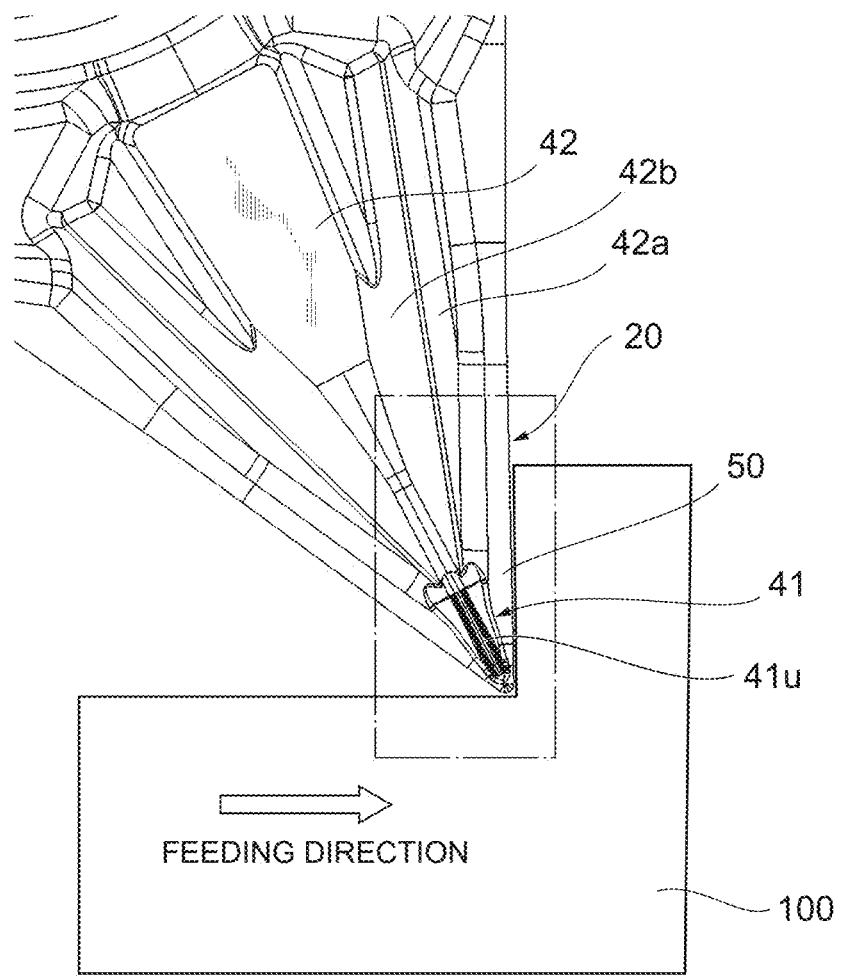
FIG. 12 is a diagram illustrating an image during machining with a middle region (with a middle-depth-of-cut) of the cutting insert.

Between the projecting portion 40 and the cutting edge 20, the rake portion 50 is formed (see FIG. 2, FIG. 6, and the like). The rake portion 50 is a portion which functions as a rake surface for the cutting edge 20 during cutting (see FIG. 10 and FIG. 12), and is formed so as to have a predetermined rake angle. The rake angle of the rake portion 50 can be defined as an angle of the rake portion 50 of concern with respect to a horizontal surface (surface parallel to the upper surface 17 and the lower surface 19) in a cross section perpendicular to the cutting edge 20. In the present embodiment, the rake portion 50 is formed such that the angular degree of the rake angle increases gradually (step by step and continuously) with distance from the corner portion 36 (in other words, a very slight twist is added to the rake surface). The rake portion 50 of the cutting insert 10 in the present embodiment also has a shape in which the angular degree of the rake angle increases with distance from the corner portion 36 and no longer increases after a deepest portion 20d (see FIG. 5) of the cutting edge 20 is reached.

Figure 8:
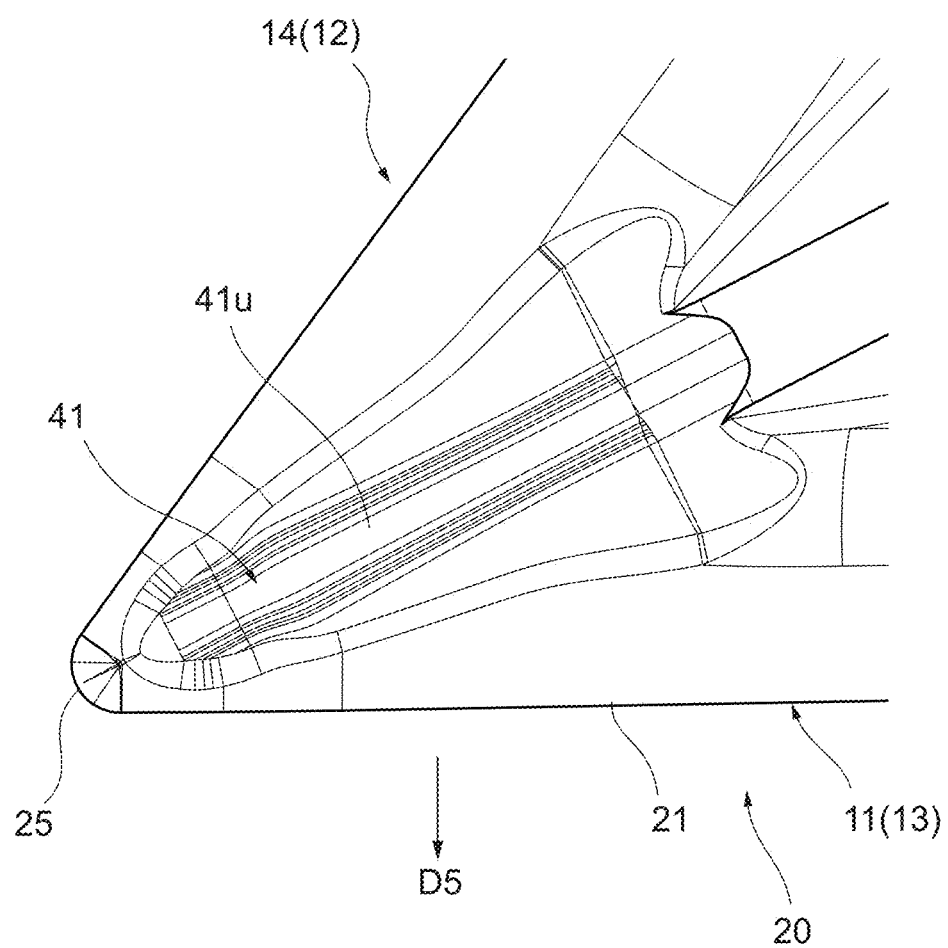
FIG. 8 is a partial plan view of the cutting insert illustrating a portion thereof with the first projection in enlarged relation.

The rake portion 50 is formed to have a flat surface in the vicinity of the corner portion 36. The flatness mentioned herein does not mean complete flatness, but means a certain degree of flatness which allows the chip 101 to more smoothly flow during cutting. In other words, particularly when the rake angle is provided and the first breaker projection 41 is formed in the vicinity of the corner portion 36, at least projections and depressions are formed, and accordingly complete flatness is not achieved in a strict sense of meaning. It is to be noted therein that, as a surface in the vicinity of the corner portion 36 is flatter, the chip 101 is allowed to more smoothly flow, and a certain degree of flatness which allows at least smoother flowing of the chip 101 is achieved (see FIG. 8 and the like). In other words, the rake surface included in the rake portion 50 is a composite surface formed by the gradients ($\theta 1$ and $\theta 2$) of an inclination S and the rake angle. The cutting insert 10 in the present embodiment has a structure in which the corner portion 36 has the rake angle, and the rake angle continuously varies though little by little even when attention is focused only on the range of the first inclination S1. Therefore, the surface in the vicinity of the corner portion 36 is formed to be flat, though not completely flat in a strict sense of meaning. In other words, when the chip 101 is to be finely cut, the rake angle is preferably set slightly sharper, but an excessively sharp rake angle results in over-restraint, and accordingly balance is important from this viewpoint.

Figure 7:
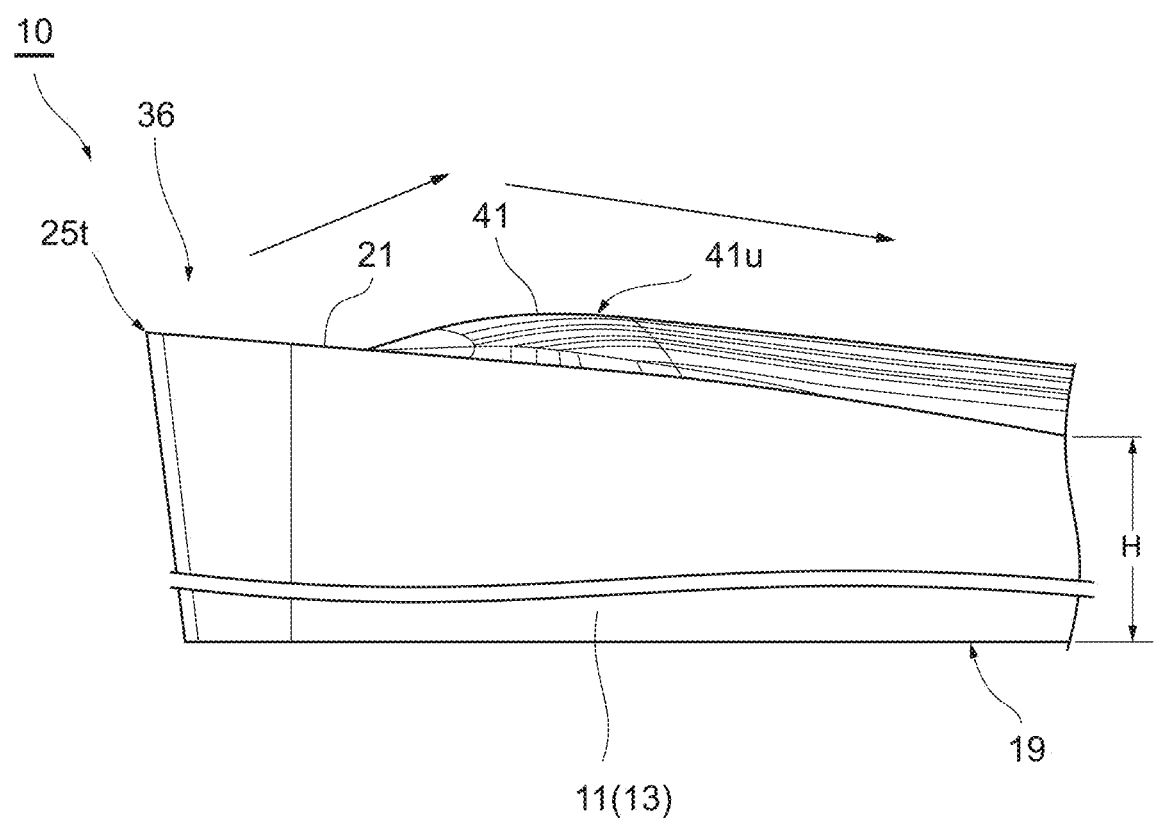
FIG. 7 is a sideview view of the portion of the cutting insert including the first projection and the second projection.
Figure 9:
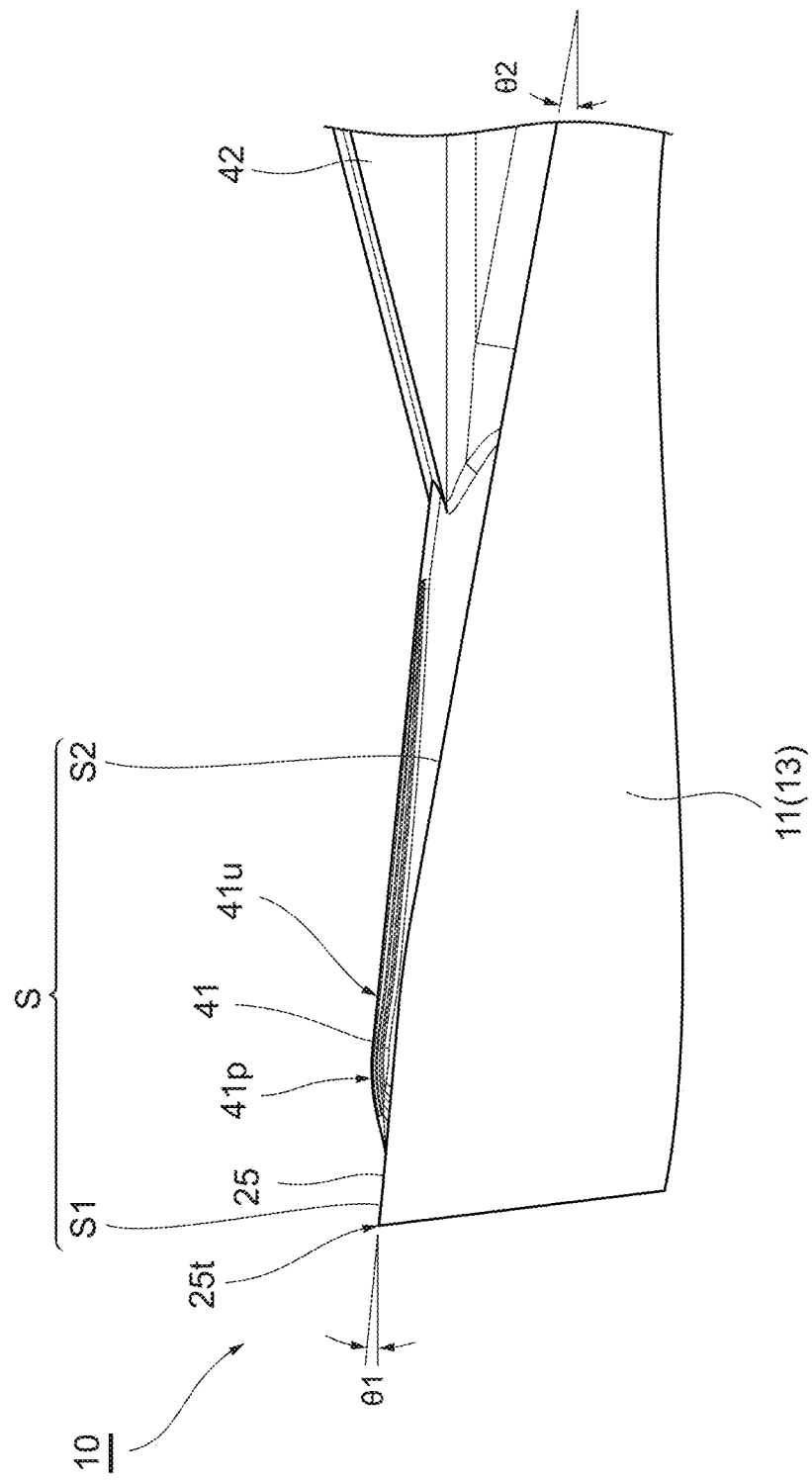
FIG. 9 is a sideview view of the portion of the cutting insert including the first projection.
Figure 11:
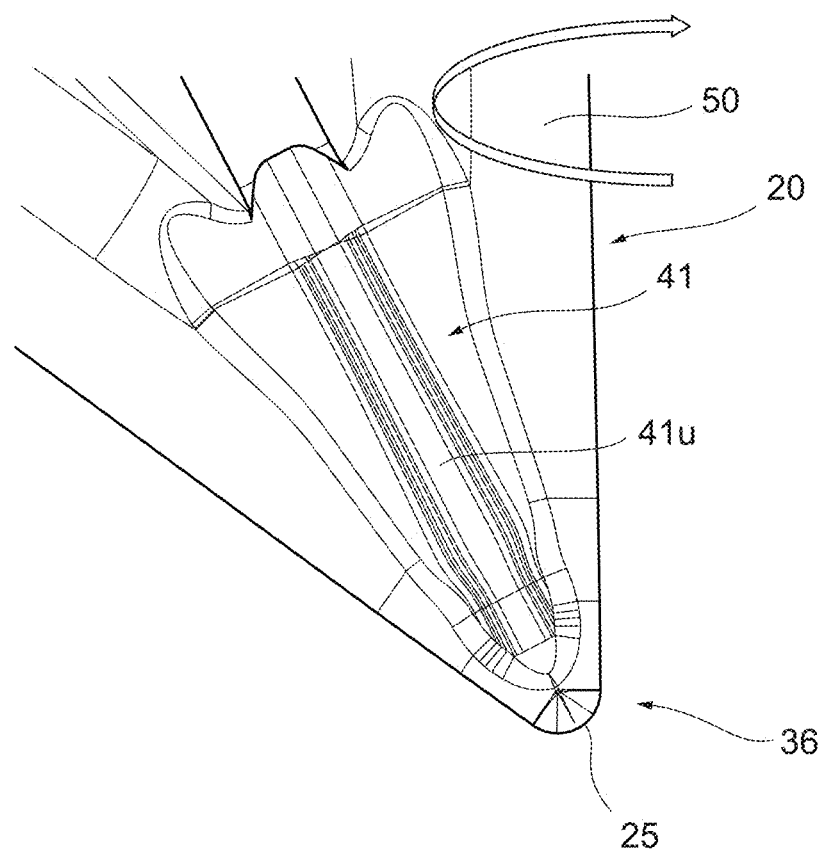
FIG. 11 is a diagram illustrating the portion of the cutting insert including the first projection that is illustrated in FIG. 10.

The cutting edge 20 is provided with the inclination (inclined portion) S such that a cutting edge height (which refers to a distance from the surface parallel to the lower surface 19 to the cutting edge 20 and is denoted by a reference sign H in the figure) gradually decreases with distance from the corner cutting edge 25 (see FIG. 7, FIG. 9, and the like). The inclination S in the cutting insert 10 in the present embodiment includes the first inclination S1 beginning at an intermediate point in the corner cutting edge 25 and a second inclination S2 continued to the first inclination S1 and having the gradient $\theta 2$ larger than the gradient $\theta 1$ of the first inclination S1 (see FIG. 9 and the like). The first inclination S1 beginning at the intermediate point in the corner cutting edge 25 serves to withdraw the chip 101 particularly when cutting is performed with the low region (with a low-depth-of-cut) toward the first breaker projection 41 at an early stage. With the inclination S, the cutting edge 20 is inclined/sloped, and the chip 101 flows along the rake surface extending along the cutting edge 20. At this time, the chip 101 is encouraged to be curled (upwardly curled) along the arrow illustrated in FIG. 11 to come into contact with the first breaker projection 41 with which the chip 101 has recently come into contact. In the cutting insert 10 in the present embodiment, it is avoided as much as possible to give, to the chip 101, a factor that causes excessive curving of the chip 101, and allowing the chip 101 to flow in a stable helical state is prioritized over cutting of the chip 101 to implement smooth discharge of the chip 101.

In the cutting insert 10 provided with the inclination S as described above, the rake portion 50 in the vicinity of the corner portion 36 may also be such that the rake angle thereof is formed according to the gradient of the first inclination S1. The rake angle and the gradient are not particularly limited to specific numerical values, but is it possible to, e.g., set the gradient $\theta 1$ of the first inclination S1 to 5° and similarly set the rake angle of the rake portion 50 in the vicinity of the corner portion 36 to 5°. For example, when the rake angle is set excessively sharp, an upward curve due to the inclination S and a lateral curve due to the rake angle are added up, and consequently the chip 101 may be less likely to flow smoothly. In such a case, the chip 101 is more likely to get stuck, and the chip 101 shaped like having been forcibly torn off is likely to be generated. As a result, quality of the machined surface deteriorates in the form of a torn surface/cloudy surface. In this regard, in the cutting insert 10 in the present embodiment having a structure as described above, the rake portion 50 (in the vicinity of the corner portion 36) prevents the chip 101 from being strongly curved as much as possible and, at an early stage, the chip 101 is allowed to flow smoothly in a given direction toward the first breaker projection 41. In other words, it is not preferable to extremely curve the chip 101 and, in this respect, it can be said that the cutting insert 10 in the present embodiment has a structure focused on allowing the chip 101 to smoothly flow over the rake surface.

Outline of Characteristic Features of Cutting Insert

The following will describe an outline of characteristic features of the cutting insert 10 in the present embodiment thus configured, together with how the present inventors have conceived of the characteristic features, matters taken into consideration, and the like.

Figures 14A, 14B:
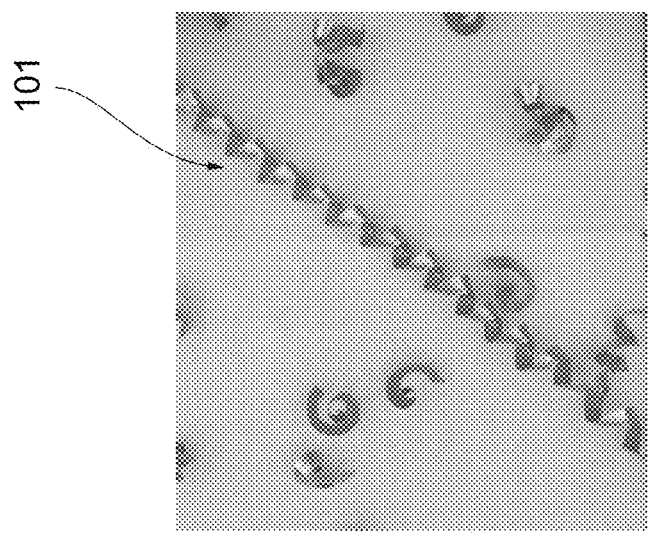
FIG. 14A illustrates an image representing an example of chip during middle region cutting that is illustrated in FIG. 12 and FIG. 13.
FIG. 14B illustrates a reference image representing an example of chip during cutting with a conventional cutting insert.

In performing cutting using the cutting insert 10, there are improvement requirements related to the chip 101 resulting from external turning/the low region (minute cutting) using an automatic lathe. Accordingly, in view of the above, a shape that brings the projection (first projection) as close as possible to the corner cutting edge was examined. However, it was proved that the shape caused such effects as an excessively reduced breaker width and curving of the chip 101 at a sharp (large) rake angle to result in a situation where, particularly in the middle region having a relatively large rake angle, so-called over-constraint was observed and affected the machined surface. In other words, in a situation where the chip 101 got stuck, there was a strong tendency toward forcible curving and cutting of the chip 101 generated from the work (material to be cut) 100 in a machined region, which resulted in an image as if the chip 101 was forcibly torn off. As a result, a rough surface/cloudy surface was observed, and it was considered that a phenomenon of degraded quality of the machined surface was likely to occur. In view of this, the present embodiment adopts a design that prioritizes discharge performance of the chip 101 in the low region. Specifically, (i) to promote upward curling (due to the inclination S with which the cutting edge 20 is provided, both the cutting edge height H and the rake surface lower with distance from the corner portion 36, and accordingly an effect of causing the chip 101 to move in an upward direction over a paper sheet with FIG. 10 and have a helically long cylindrical shape as illustrated in FIG. 14A is achieved), the cutting edge 20 is provided with the inclination (inclined portion) S and (ii) to promote the curling (i.e., to withdraw the chip toward the first breaker projection 41), a position where the inclination S begins is set in the corner portion 36. In addition, from the results of various comparison tests, it was found that, as the rake angle of the rake portion 50 and the gradient of the inclination S were brought closer to each other, flow performance of the chip 101 in the low region was smoother and therefore, by providing a structure in which the gradient of the inclination S and the rake angle have substantially equal values, the chip 101 is allowed to flow smoothly from the rake surface of the corner portion 36 toward the first breaker projection 41, while being prevented from having an extremely curved shape. However, the first breaker projection 41 is prevented from being excessively high, and is shaped to control the chip 101 by using only a leading end thereof (the portion of the cutting insert 10 in which the first breaker projection 41 is formed) as much as possible. It is preferable that a cross section of the first breaker projection 41 also has a gentle shape. The first breaker projection 41 has a shape in which the height thereof gradually decreases with the inclination S of the cutting insert 10 to allow the space (chip pocket) when the chip 101 flows to be formed.

Figure 13:
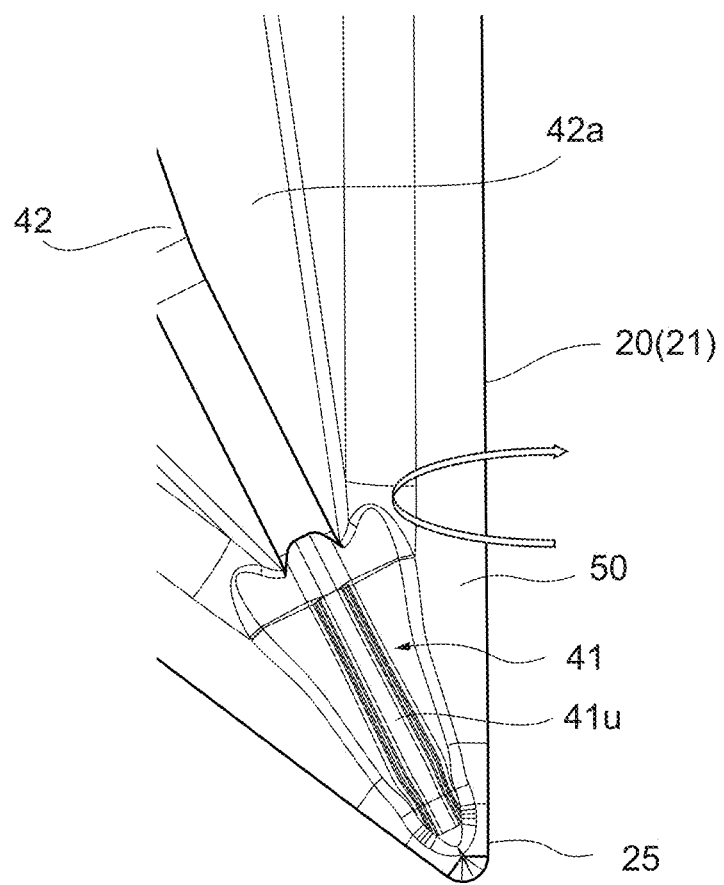
FIG. 13 is a diagram illustrating the portion of the cutting insert including the first projection and the second projection that is illustrated in FIG. 12.

Another request for the cutting insert 10 is to solve a problem of a large number of burrs/chattering formed in semi-finishing of stainless steel. In this regard, the design that prioritizes the discharge performance of the chip 101 in the low region as described above is adopted, and also an effective cutting edge (in the cutting insert 10 in the present embodiment, the effective cutting edge has a range extending until the main cutting edge 20 reaches the deepest portion (denoted by the reference sign 20d in FIG. 5) is extended in a side view (see FIG. 5) or a sideview view (see FIG. 9) so as to allow machining to be performed also with the middle region. At this time, to lower cutting resistance during cutting with the middle region, the rake portion 50 having the rake angle larger in the middle region than in the lower region is configured to be able to inhibit the burrs/chattering. For the inclination also, the second inclination S2 having a depth larger (an inclination larger) than that of the first inclination (first-level inclination in the low region) S1 is formed. The second inclination S2 thus formed further promotes curling (upward curling) along the arrow illustrated in FIG. 13. In addition, by setting the gradient θ2 of the second inclination S2 larger than the rake angle (of the rake portion 50 in the portion of concern), it is possible to improve the cutting performance and provide a structure in which anti-chattering performance is improved, formation of burrs is inhibited, and the cutting resistance is reduced.

In addition, particularly for the middle region, the second breaker projection 42 is formed to have a cross section having a two-level shape. It can also be considered to provide the second breaker projection 42 with a structure in which the second breaker projection 42 has a height lowering along the inclination S, similarly to the first breaker projection 41. However, in such a case, the chip pocket is excessively large to possibly cause a problem that the wide chip 101 is exhausted, while being swung, under high-depth-of-cut/low-feed-rate conditions or the like to cause unstable chip flow/generation, which is the same as that encountered by the conventional cutting insert. In view of this, the present embodiment forms the second breaker projection 42, while thoughtfully intending to provide a structure in which the chip pocket is relative narrowed in the middle region, unlike in the low region. The second breaker projection 42 is provided with a multi-level configuration in which the first-level wall surface 42a is mainly used to form a space that is not excessively large so as to serve as a guide for the helically generated chip 101, and the second-level wall surface 42b is provided with a shape having an appropriately enlarged space to secure the chip pocket, while achieving the discharge performance of the chip 101. These achieve the effect of allowing the rather long chip 101 having a stably helical shape to be discharged (see FIG. 14A). Meanwhile, in the case of the conventional cutting insert in which such an effect is not achieved, a helical portion has no problem when the chip 101 starts to come out but, when the chip pocket is large and has a high degree of freedom, the chip 101 is swung during machining and more likely to be extended and tangled (see FIG. 14B). Particularly when the cutting insert is used for the automatic lathe, a ratio of an amount of feeding to an amount of cutting is extremely lower than that for a general-purpose lathe, and accordingly such a phenomenon is likely to occur (in the case of the general-purpose lathe, the ratio of the amount of feeding increases to thicken the chip 101. In such a situation, the chip pocket is narrow and more likely to be clogged to lead to chipping or the like). Therefore, in view of such a problem, in the present embodiment, the chip pocket is limited to a degree in the middle region, and a structure is provided in which the first-level wall surface 42a of the second breaker projection 42 is used as a guide to allow the chip 101 to flow.

The cutting insert 10 having such characteristic features as described above in the present embodiment allows a wide region including the low region (fine finishing) to the middle region (medium cutting) to be covered with a single insert. In other words, a structure is provided which is particularly appropriate for finishing (low-depth-of-cut/low-feed-rate machining) and also has a so-called expanded application range so as to allow quality cutting to be carried out even when cutting is performed with a high-depth-of-cut. This is achieved by further expanding the application range on a high-depth-of-cut side particularly by providing the first breaker projection 41 having the structure that inhibits over-restraint, while securing the space for allowing the chip 101 to flow as described above, further providing the second breaker projection 42 having the two-level structure focusing on the guiding of the chip 101, and adjusting the slant (inclination) of the cutting edge 20 (i.e., setting different gradients for the first breaker projection 41 and the second breaker 42). This is also achieved by gradually varying the rake angle of the rake portion 50 and thereby reducing the cutting resistance to allow the application range to be further expanded. Thus, the effect of the so-called optimized projecting portion 40 (the first breaker projection 41 and the second breaker projection 42) is also additionally achieved to implement smooth chip generation/discharge without involving over-restraint.

Note that the embodiment described above is an example of preferred implementation of the present invention, but is not limited thereto. Various modifications can be made within a scope not departing from the gist of the present invention.

The present invention is preferably applied to a cutting insert for cutting (mainly turning).

What is claimed is:
1. A cutting insert comprising:
an upper surface serving as a first end surface;
a lower surface serving as a second end surface opposite to the upper surface and having a mounting surface to be brought into contact with a body of a cutting tool;
a peripheral side surface formed to connect the upper surface and the lower surface;

a cutting edge including a main cutting edge and a corner cutting edge, the main cutting edge and the corner cutting edge being formed at an intersecting edge between the upper surface and the peripheral side surface;

a projecting portion including a first projection formed to have an elongated shape elongated in a direction extending from a corner portion toward a central axis, the central axis extending through a center of the upper surface in a direction perpendicular to the lower surface, and having a top surface including a portion having a height decreasing with distance from the corner portion toward the central axis and a second projection extending from the first projection and having a top surface having a height increasing with distance from the first projection toward the central axis; and a rake portion formed between the projecting portion and the cutting edge, wherein the cutting edge has an inclined portion provided to extend from an intermediate point in the corner cutting edge such that a height of the cutting edge from the lower surface decreases with distance from the corner cutting edge, the inclined portion includes a first inclined portion beginning at the intermediate point in the corner cutting edge, and a rake angle of the rake portion increases with distance from the corner portion.

2. The cutting insert according to claim 1, wherein the inclined portion further includes a second inclined portion connected to the first inclined portion and having a gradient larger than that of the first inclined portion.

3. The cutting insert according to claim 1, wherein a portion of the rake portion adjacent to the corner portion forms a flat surface.

4. The cutting insert according to claim 1, wherein a peak point of the first projection is higher than a cutting edge of the corner cutting edge.

5. The cutting insert according to claim 4, wherein the first projection has a height gradually decreasing with distance from the peak point toward the central axis.

6. The cutting insert according to claim 1, wherein a side portion of the second projection is formed in a multi-step shape.

7. The cutting insert according to claim 6, wherein a portion of the second projection located between the top surface of the second projection and the rake portion is formed with a wall surface.

8. The cutting insert according to claim 7, wherein the wall surface has a first-level wall surface rising from the rake portion and a second-level wall surface provided between the first-level wall surface and the top surface of the second projection.

9. The cutting insert according to claim 8, wherein the first-level wall surface is formed such that a space, formed between the first-level wall surface and the rake portion so as to allow chip to flow, becomes smaller with distance from the corner portion.

* * * * *